United States Patent
Ayat et al.

(10) Patent No.: US 12,149,150 B2
(45) Date of Patent: Nov. 19, 2024

(54) SUPERCONDUCTING BULK COMPRISING A CAVITY AND ASSOCIATED ELECTRIC MACHINE

(71) Applicants: SAFRAN, Paris (FR); UNIVERSITE DE LORRAINE, Nancy (FR)

(72) Inventors: Sabrina Siham Ayat, Moissy-Cramayel (FR); Alexandre Colle, Moissy-Cramayel (FR); Rémy Biaujaud, Moissy-Cramayel (FR)

(73) Assignees: SAFRAN, Paris (FR); UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 17/784,473

(22) PCT Filed: Dec. 7, 2020

(86) PCT No.: PCT/FR2020/052301
§ 371 (c)(1),
(2) Date: Jun. 10, 2022

(87) PCT Pub. No.: WO2021/116575
PCT Pub. Date: Jun. 17, 2021

(65) Prior Publication Data
US 2023/0037086 A1 Feb. 2, 2023

(30) Foreign Application Priority Data
Dec. 13, 2019 (FR) ........................................ 1914344

(51) Int. Cl.
*H02K 55/00* (2006.01)
*B64D 27/24* (2006.01)
(Continued)

(52) U.S. Cl.
CPC ............. *H02K 55/02* (2013.01); *B64D 27/24* (2013.01); *H01F 6/00* (2013.01); *H02K 15/02* (2013.01)

(58) Field of Classification Search
CPC ......... H02K 55/00; H01F 6/00; H05K 9/0077
See application file for complete search history.

(56) References Cited

U.S. PATENT DOCUMENTS

| 3,652,967 A | 3/1972 | Tanaka et al. | |
| 4,960,760 A * | 10/1990 | Wang | F41B 6/00 104/138.1 |
| 6,981,671 B1 * | 1/2006 | Baron | H01G 11/40 244/119 |

FOREIGN PATENT DOCUMENTS

| CN | 106972734 A | 7/2017 | |
| CN | 108811479 A * | 11/2018 | ........... H05K 9/0077 |

(Continued)

OTHER PUBLICATIONS

Colle et al., "Design of a flux modulation superconducting machine for aeronautics using HTS superconductors", Jan. 1, 2017, XP055649888, pp. 1-2.
(Continued)

*Primary Examiner* — Ramon M Barrera
(74) *Attorney, Agent, or Firm* — Birch, Stewart, Kolasch & Birch, LLP

(57) ABSTRACT

The present invention relates to a superconducting pellet for a superconducting electrical machine, the superconducting pellet having a circumferential wall, the circumferential wall having: a first border, a second border opposite the first border, an inner face connecting the first border to the second border, an outer face opposite the inner face, and a cavity formed between the first border and the second border and defined by the inner face, and an additional wall which covers the first border or is flush with the first border so as (Continued)

to at least partially cover the cavity, or extends from the inner face at a distance from the first border and the second border so as to divide the cavity into two portions.

16 Claims, 9 Drawing Sheets

(51) Int. Cl.
    *H01F 6/00*      (2006.01)
    *H02K 15/02*    (2006.01)
    *H02K 55/02*    (2006.01)

(56) References Cited

FOREIGN PATENT DOCUMENTS

| | | |
|---|---|---|
| EP | 0 594 851 A1 | 5/1994 |
| EP | 3 088 909 A1 | 11/2016 |
| EP | 3 249 663 A1 | 11/2017 |
| JP | 4-282050 A | 10/1992 |

OTHER PUBLICATIONS

Colle et al., "Evaluation des Pertes dans une Machine Supraconductrice à Modulation de Flux", Nov. 1, 2018, XP055649650, pp. 1-5 (6 pages total), https://hal.archives-ouvertes.fr/hal-01910634/document.
French Search Report for French Application No. 1914344, dated Sep. 1, 2020.
International Search Report for International Application No. PCT/FR2020/052301, dated Mar. 11, 2021.

\* cited by examiner

SUPERCONDUCTING BULK COMPRISING A CAVITY AND ASSOCIATED ELECTRIC MACHINE

TECHNICAL INVENTION

The present disclosure relates to the field of electric machines comprising superconducting bulks, which can especially be used in aircrafts. In particular, the disclosure applies to electric machines comprising magnetised or non-magnetised bulks, electric machines fitted with superconducting magnets or superconducting flow barriers, fully superconducting machines (superconducting armature and inductor) or partially superconducting (superconducting armature or inductor) and to superconducting radial, linear or axial flow machines.

BACKGROUND

Part of engineering is preoccupied with future transport means seeking to make systems more ecological. In the field of aerial transport, different projects and prototypes have already appeared, such as SOLAR IMPULSE or the E-FAN by Airbus. Environmental preoccupations, reduction in fuel consumption and noise output are so many criteria which encourage the use of electric machines. To supplant current technologies, aeronautical manufacturers are working on increasing the mass power of these electric machines. Accordingly, a study is being conducted on the gain possibly contributed by superconducting materials HTC (acronym for critical high temperature) for embedded actuators.

Superconducting material is material which, when cooled to a temperature below its critical temperature, exhibits zero resistivity in offering the possibility of having continuous lossless current circulate. Several phenomena result from this, such as the diamagnetic response for any variation in the magnetic field, providing excellent magnetic shielding.

As is known per se, an electrical machine comprises an inductor and an armature. The inductor comprises an HTC coil made with HTC wire which generates a magnetic field modulated by superconducting bulks which constitute magnetic screens. The armature per se comprises a triphasic copper winding system which sits on a ferromagnetic or antimagnetic support. The rotation of screens varies the magnetic field and armature, and by way of the Lenz law causes an electromotive force in the winding. The dimensioning of such a machine results in an axial flow structure without revolving feed system (ring/brush type). Maintenance and safety issues caused by a revolving ring/brush system are therefore avoided.

This electrical machine is partially superconducting to the extent where only the inductor is made of superconducting material, as compared to a fully superconducting machine whereof all active parts are designed using superconducting materials.

In the following, 'inductor' will mean the HTC coil and the superconducting bulks configured to modify the magnetic flow created by the HTC coil. It is clear, in an electrical superconducting machine with flow barriers, that the diamagnetic performance of the superconducting bulks is used when they are cooled out of field. The superconducting bulks are in this case non-magnetised and form a screen (screening) which diverts the field lines when they are dipped into a magnetic field. The magnetic field is then concentrated and of high amplitude between the superconducting bulks non-magnetised and weak downstream of the latter. As a variant, the superconducting bulks can be magnetised and form superconducting magnets, referred to as a machine with superconducting magnets.

Generally, bulks are made of YBCO (Yttrium Barium Copper Oxide for Oxides mixed with Barium, Copper and Yttrium), GdBCO (Gadolinium-Barium-Copper-Oxygen), and/or NbTi (for niobium-titanium) which especially have very good screening characteristics.

Bulks are generally obtained by way of the germ growth process. Reference could be made especially to the article by M. Morita, H. Teshima, and H. Hirano, «Development of oxide superconductors', Nippon Steel Technical Report, vol. 93, p. 18-23, 2006 for more details on this process. In particular, this type of process consists of forming a crystal by progressive adding of material to the surface of a pre-existing germ. The resulting bulks therefore generally have circular or rectangular forms. As a variant, it has also been proposed to produces bulks by sintering. But, the inter-grain connection associated with this manufacturing process tends to diminish performances of the bulks. Another process consists of using superconducting tapes for making superconducting bulks. In this case these are tape stacks. These bulks, the superconducting core of which is reinforced by the matrix of the tapes constituting it, exhibit good mechanical resistance. This good mechanical resistance is particularly advantageous when the bulks are magnetised (machine with superconducting magnets).

In an electrical machine comprising superconducting bulks distribution of the magnetic flow depends directly on the form of the screen which opposes (machines with flow barriers) or guides (machine with superconducting magnets) the passage of the flow. Now, the applicant has become aware that the circular form of the superconducting bulks was not effectively maximising the torque density of the electrical machine or its weight.

SUMMARY

An aim of the present disclosure is to optimise a superconducting machine as a function of its main dimensioning criterion, for example its torque density, its mass or again its production complexity.

The disclosure applies to any type of superconducting machine, comprising especially partially superconducting or fully superconducting machines, with flow barriers or with superconducting magnets, with radial, linear or axial flow.

For this reason a superconducting bulk for an electrical superconducting machine has been proposed, said superconducting bulk having a circumferential wall, said circumferential wall having:
- a first border
- a second border opposite the first border
- an internal face connecting the first border and the second border
- an external face opposite the internal face,
- a cavity formed between the first border, the second border and delimited by the internal face, and
- a supplementary wall.

Also, the supplementary wall covers the first border or is flush with said first border so as to cover the cavity at least partially, or extends from the internal face at a distance from the first border and the second border so as to divide the cavity into two parts.

Some preferred but non-limiting characteristics of the superconducting bulk according to the first aspect are the following, taken individually or in combination:
- the supplementary wall covers the first border or is flush with said first border so as to cover the cavity at least partially, and the superconducting bulk also comprises a second supplementary wall covering the second border or being flush with said second border so as to close off the cavity at least partially;

the supplementary wall covers the first border and the second supplementary wall covers the second border;

the superconducting bulk also comprises at least one third supplementary wall which extends from the internal face at a distance from the first border and the second border so as to divide the cavity into two parts;

the supplementary wall, the second supplementary wall and the at least one third supplementary wall have an identical thickness;

one at least of the first supplementary, the second supplementary wall and the at least one third supplementary wall comprises a through hole;

one at least of the first supplementary, the second supplementary wall and the at least one third supplementary wall is devoid of through hole;

each of the first supplementary, the second supplementary wall and the at least one third supplementary wall comprises a through hole;

an internal diameter of the through hole of the at least one third supplementary wall is greater than or equal to an internal diameter of the through hole of the supplementary wall and of the second supplementary wall;

the superconducting bulk comprises at least three third supplementary walls, the internal diameter of the through hole of the third supplementary walls which are adjacent to the first supplementary wall or to the second supplementary wall being less than the internal diameter of the through hole of the supplementary wall which is at a distance from said first and second supplementary walls;

the supplementary wall comprises a through hole; and/or the cavity passes through from the first border to the second border.

According to a second aspect, it is proposed a production process of a superconducting bulk according to the first aspect, said process comprising the following steps:

S1: making the circumferential wall by placing the cavity between the first border, the second border and the internal face;

S2: making at least one supplementary wall;

S3: assembling the circumferential wall with the at least one supplementary wall;

step S3 comprising one of the following sub-steps:

S31: fixing the supplementary wall against the internal face of the circumferential wall, at a distance from the first border and the second border so as to divide the cavity into two parts; or S32: fixing the supplementary wall onto the first border so as to cover the cavity at least partially; or S33: fixing the supplementary wall against the internal face so as to be flush with the first border and cover the cavity at least partially.

Some preferred but non-limiting characteristics of the production process according to the second aspect are the following, taken individually or in combination:

step S3 comprises steps S32 and S33 so as to fix a supplementary wall at the same time onto the first border or against the internal face so as to be flush with the first border and a supplementary wall or against the internal face so as to be flush with the second border so as to close off the cavity at least partially;

the process also comprises step S32;

step S32 is reiterated so as to fix several supplementary walls against the internal face of the circumferential wall, at a distance from the first border and the second border so as to divide the cavity into several parts;

the process also comprises a sub-step for producing a through hole in all or some of the supplementary walls;

the process also comprises a sub-step for producing a through hole in the supplementary wall.

According to a third aspect, it is proposed an electrical superconducting machine comprising a inductor comprising at least one superconducting bulk according to the first aspect and an armature.

According to a fourth aspect, it is proposed an aircraft comprising an electrical machine according to the third aspect.

DESCRIPTION OF THE DRAWINGS

Other characteristics, aims and advantages of the disclosure will emerge from the following description which is purely illustrative and non-limiting, and which must be considered with respect to the appended drawings wherein.

In all the figures similar elements bear identical references.

DETAILED DESCRIPTION

Hereinbelow, the invention will be described and illustrated in the case of a partially superconducting electrical machine of axial flow with flow barriers having non-magnetised bulks. As already pointed out earlier, this is however not limiting, the invention applying mutatis mutandis to electric machines comprising magnetised bulks, to electric machines with superconducting magnets, to fully superconducting electric machines (superconducting armature and inductor) and to electric machines with radial or linear flow.

Figure 1:
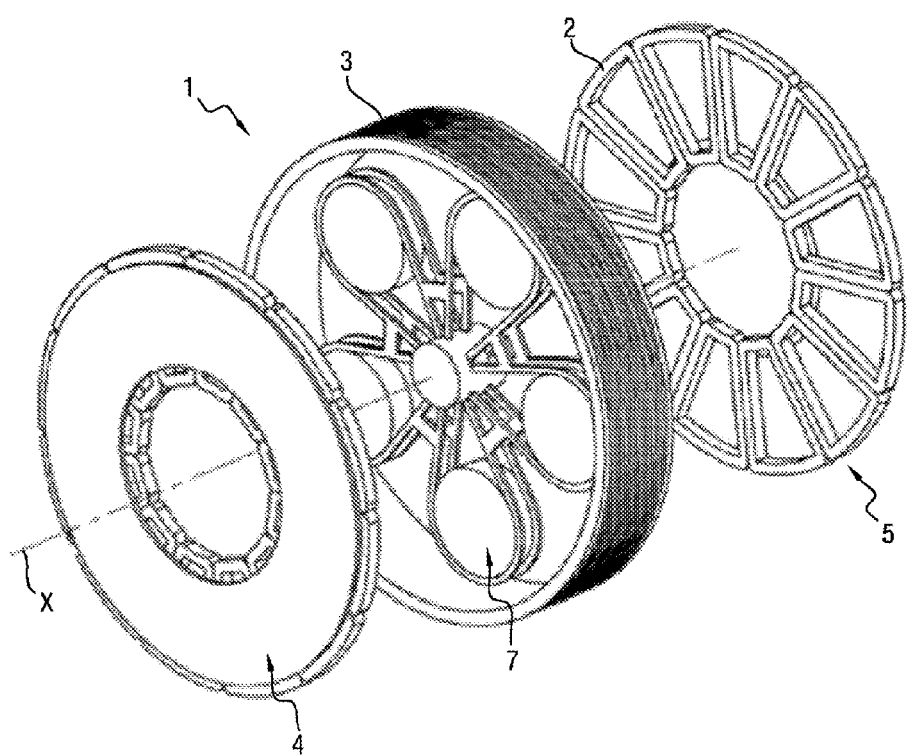
FIG. 1 is an exploded and schematic view of an example of electrical machine with axial flow according to an embodiment of the invention.

FIG. 1 schematically illustrates a superconducting electrical machine 1 with axial flow with flow barriers according to an embodiment of the invention, conventionally comprising a revolving part, or rotor, and a fixed part, or stator.

As known per se, the electrical machine 1 with axial flow superconducting comprises an armature 2 and an inductor 3. The armature 2 comprises an arrangement 4 of non-superconducting electromagnetic coils 5, generally copper, defining an axial direction X, a circumferential direction and a radial direction. The inductor 3 comprises a superconducting coil 6 coaxial to the placing 4 of the electromagnetic coils 5 of the armature 2 and the superconducting bulks 7 arranged in the same plane orthogonal to the axial direction X and radially inside the superconducting coil 6. Optionally, the inductor 3 also comprises a stator cylinder head comprising an iron crown 8. Here, the rotor is formed by the superconducting bulks 7 which are driven in rotation about an axis of rotation extending according to the axial direction X. The stator is formed by the arrangement 4 of electromagnetic coils 5 and the superconducting coil 6.

The superconducting bulks 7 are made of superconducting material and are distributed equidistantly around the axis of rotation, allowing spatial variation in the electromagnetic field in the air gap. Here, the superconducting bulks 7 are non-magnetised. As a variant, the superconducting bulks 7 could be magnetised. For example, the bulks are made of YBCO (Yttrium Barium Copper Oxide for Oxides mixed with Barium, Copper and Yttrium), GdBCO (Gadolinium-Barium-Copper-Oxygen), and/or NbTi (for niobium-titanium).

The superconducting coil 6 of the inductor 3 is a superconducting static coil fed by continuous current. If appropriate, when the electrical machine 1 comprises a cylinder head 4 it ensures a mechanical resistance of the electromagnetic coils 5 and guarantees a larger cooling surface. In other terms, the inductor 2 is superconducting whereas the armature 3 is non-superconducting.

As is known per se, a conventional superconducting bulk has the form of a disc. Via their manufacturing process, the discs are full (solid).

To optimise the electrical machine, the disclosure proposes adapting the form of the superconducting bulk 7 to the thickness of penetration of the magnetic field in the bulk 7.

More precisely, the superconducting bulk 7 comprises a circumferential wall 8, said circumferential wall 8 having:
a first border 9
a second border 10 opposite the first border 9
an internal face 11 connecting the first border 9 and the second border 10
an external face 12 opposite the internal face 11 and
a cavity 13 formed between the first border 9, the second border 10 and delimited by the internal face 11 of the circumferential wall 8.

Figure 5C:
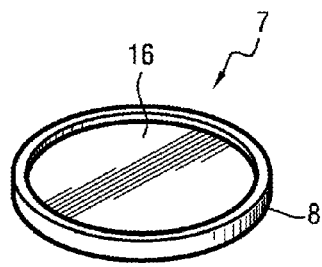
Figure 6:
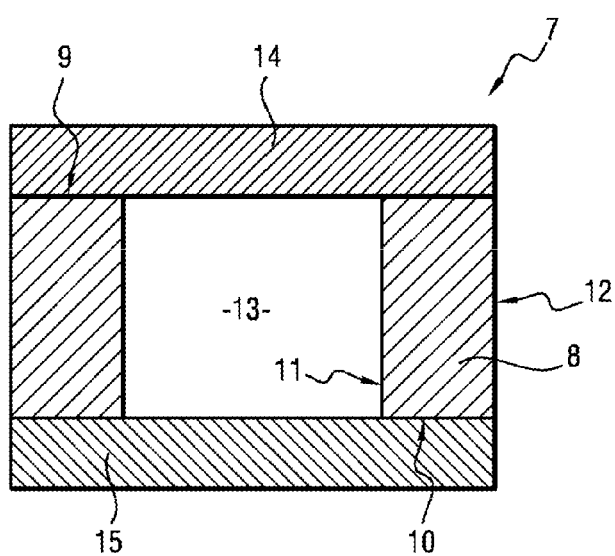
FIG. 6 is a sectional view of a third embodiment of a superconducting bulk according to the invention.
Figure 7:
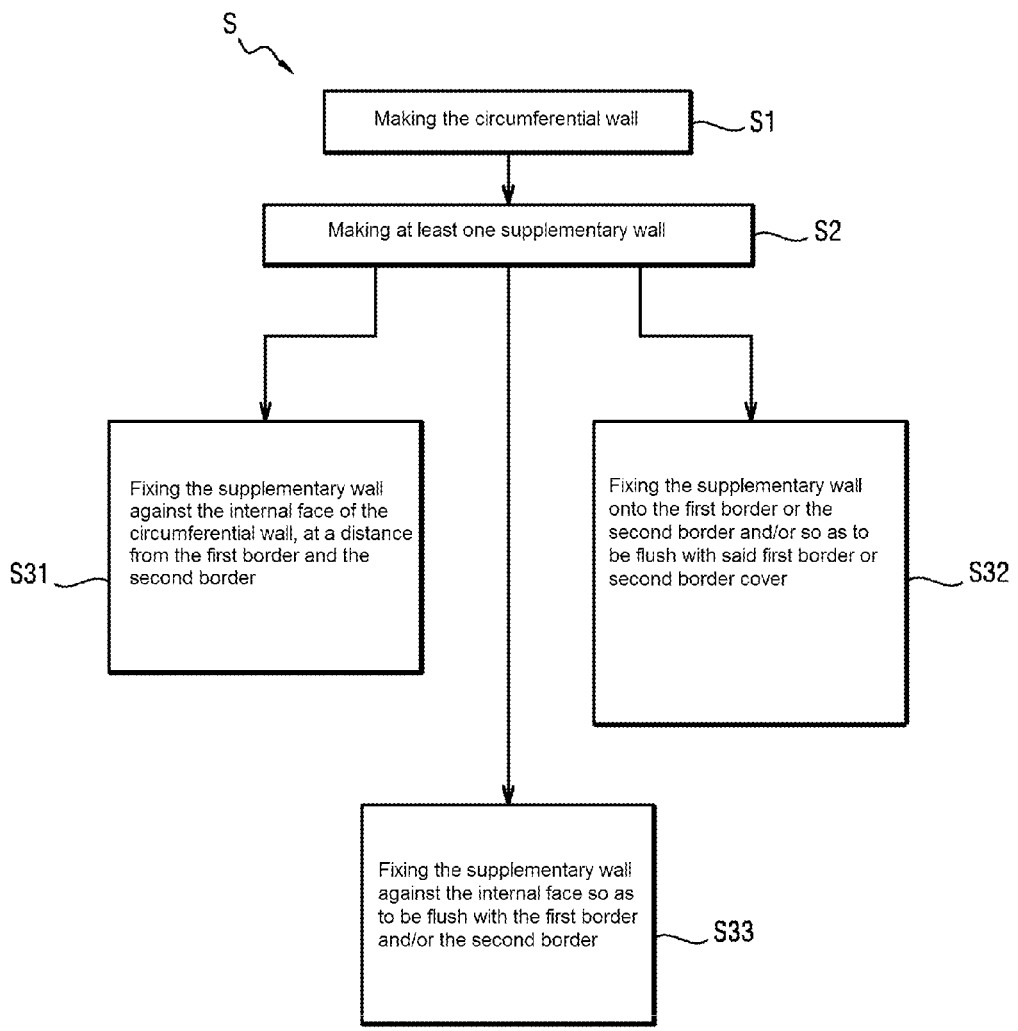
FIG. 7 is a flowchart of steps of an example of a production process of superconducting bulks according to an embodiment of the invention.

The internal face 11 extends radially inside the external face 12. The superconducting bulk 7 is therefore hollow in that it has a cavity 13 which, as is clear below, can be terminating (FIG. 5c), through (FIGS. 3a and 3b) or enclosed in the superconducting bulk 7 (FIG. 6). The cavity is preferably empty (devoid of material).

Advantageously, the cavity 13 of the superconducting bulk 7 is dimensioned so as to maximise the power of the variation in magnetic field during rotation of the or, while minimising the mass of the superconducting bulks 7 to allow a rise in speed of rotation of the rotor. In fact, making a superconducting bulk 7 with a cavity 13 reduces the mass of the superconducting bulk 7. But as can be seen from FIG. 4, the absence of material in the region of the cavity 13 in the superconducting bulk 7 can affect modulation of the magnetic field flow, and therefore the power of the electric engine.

Figure 2:
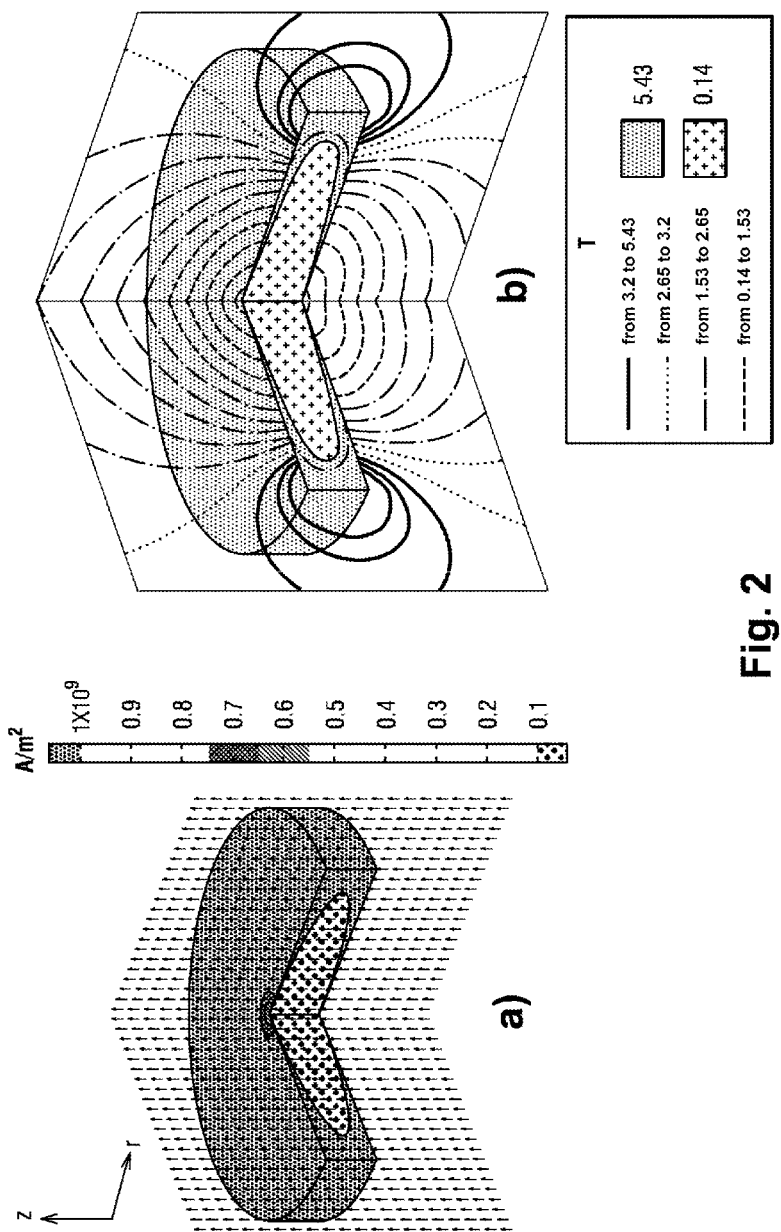
FIG. 2a) is a three-dimensional electromagnetic model having finished elements of a superconducting bulk according to the prior art immersed in a magnetic field of fixed amplitude, where lines of magnetic flow are shown.
FIG. 2b) illustrates the three-dimensional electromagnetic model having finished elements of the superconducting bulk of FIG. 2a), where isolines of magnetic flow are shown.

More precisely, the majority of the current in the superconducting bulks 7 develops over a fine length of penetration from its external faces. FIG. 2a) presents the distribution of the lines of magnetic field near a conventional superconducting bulk 7 (full disc) obtained by a three-dimensional electromagnetic model having finished elements (H formulation). Particular reference could be made to the article by M. D Ainslie et al., 'Modeling and Electrical Measurement of Transport AC Loss in HTS-Based Superconducting Coils for Electric Machines', IEEE Transactions on Applied Superconductivity, Vol. 21, No. 3, pp 3265-3268, 2011 for more details on this type of model.

The radius of the conventional superconducting bulk here is 4 cm. This conventional superconducting bulk is immersed in a magnetic field of 3 T (Tesla) and has a critical current density of 1000 A/mm$^2$. Due to the Lenz law and the properties of superconducting materials, a screening current is developed from the periphery of the superconducting bulk to cancel the internal magnetic field. The thickness of penetration depends on the intensity of the magnetic field wherein the superconducting bulk is immersed, as well as the intrinsic electric properties of the bulk. It is clear from FIG. 2a) that the thickness of penetration is greater along the axis r than along the axis z. The thickness of penetration along the axis z is therefore proportional to the distance to the centre of the conventional superconducting bulk. FIG. 2a) also reveals the way wherein the field lines are diverted by the conventional superconducting bulk.

FIG. 2b) presents the isolines of magnetic flow. The density of magnetic flow behind conventional superconducting bulks is minimal, confirming and illustrating the principle of screening described hereinabove. The spatial variation in the magnetic field produced by the inductive coil, produced by rotation of the superconducting bulks on the rotor, is paramount for functioning of an electrical machine with flow barriers. In fact, for functioning of the electrical machine in generator mode it is the variation of the magnetic field which generates an electromagnetic force in the static coils of the armature 2. If the thickness of penetration of the superconducting bulk is too high, the performances of the electrical machine are degraded.

Figure 3:
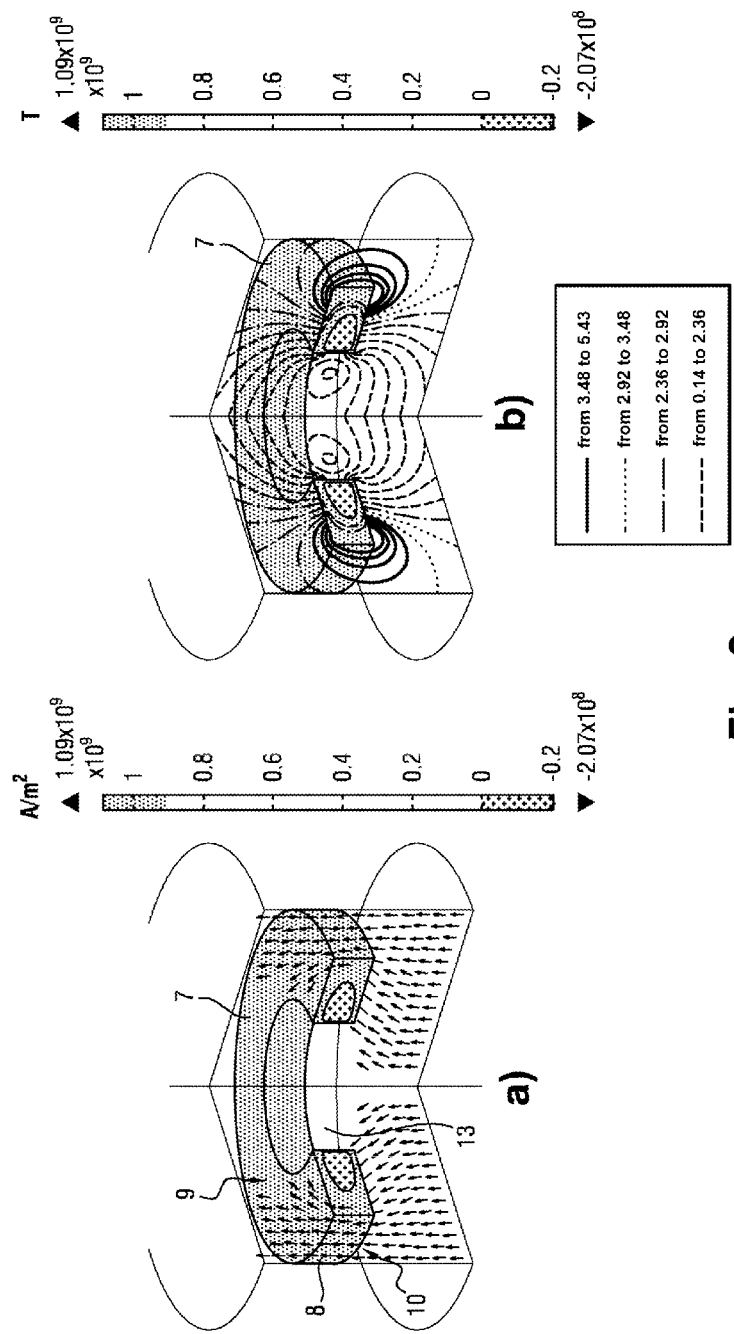
FIG. 3a) is a three-dimensional electromagnetic model having finished elements of a superconducting bulk according to first embodiment immersed in a magnetic field of fixed amplitude, where lines of magnetic flow are shown.
FIG. 3b) illustrates the three-dimensional electromagnetic model having finished elements of the superconducting bulk of FIG. 3a), where isolines of magnetic flow are shown.

In comparison, FIG. 3a) shows the distribution of the lines of magnetic field near a superconducting bulk 7 according to a first embodiment, obtained with the same three-dimensional electromagnetic model having finished elements (H formulation).

In this first embodiment, the cavity 13 of the superconducting bulk 7 is through and at the same time terminates in the region of the first border 9 and of the second border 10. In other terms, the superconducting bulk 7 forms a ring. In FIGS. 3a) and 3b, a portion of the superconducting bulk 7 has been omitted to allow viewing of the lines of magnetic flow and the isolines of magnetic flow within the superconducting bulk 7. It is understood that the superconducting bulk 7 forms a complete ring and that the cavity 13 does not terminate in the external face 12 of the circumferential wall 8.

Figure 4:
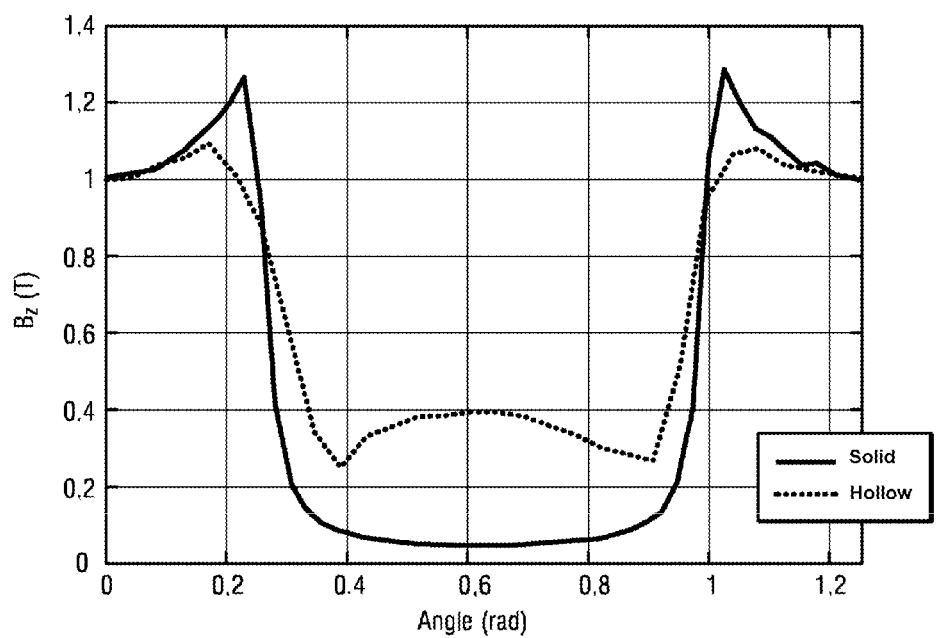
FIG. 4 illustrates the variation of the axial component of the magnetic field armature ($B_z(T)$) as a function of the angular position (rad) of the rotor of the electrical machine of FIG. 1, said variation being calculated via a three-dimensional electromagnetic model having finished elements of an electrical machine when the electrical machine comprises the superconducting bulks illustrated in FIGS. 2a) and 2b) (Full) or in FIGS. 3a) and 3b) (Hollow).

FIG. 4 shows the induction of a given electrical machine comprising superconducting bulks 7 as per FIGS. 2a) and 2b (Full curve) for this same electrical machine wherein the superconducting bulks 7 according to the first embodiment of FIGS. 3*a*) and 3*b* are used (Hollow curve). It eventuates that the presence of the cavity 13 in the superconducting bulks 7 according to the first embodiment affects modulation of the magnetic flow. In fact, the variation in the axial component of the magnetic field armature $B_z(T)$ of the superconducting bulks 7 in keeping with the first embodiment is reduced by 30% relative to the variation in the magnetic field armature with conventional superconducting bulks 7. Also, screening of the magnetic flow is maximal for an angle θ=0.4 rad then diminished for θ belonging to [0.4 rad; 0.9 rad]. In this way, the minimal thickness of penetration according to the axis z contributes considerably to the screening of the flow.

However, in the two examples ('Full' curve and 'Hollow' curve), the speed of rotation of the rotor of the electrical machine is identical. And as was stated earlier, this speed of rotation can be increased in the case of the superconducting bulks 7 of the present disclosure, the cavities 13 reducing their mass. This rise in speed of rotation of the rotor therefore boosts the power of engine the electric and partially or fully compensates the reduction in variation of the magnetic field due to the presence of the cavity 13.

In a second embodiment (see especially FIG. 5*c*)), the superconducting bulk 7 also comprises at least one supplementary wall 16 extending from the internal face 11 of the circumferential wall 8, within the cavity 13.

The supplementary wall 16 can be an internal wall placed at a distance from the first border 9 and the second border 10, as illustrated in figure c), so as to divide the cavity 13 into two parts (of equal or different volume) or as a variant be an external wall which is flush with the first border 9 or the second border 10 and therefore at least partially stoppers the cavity 13 in the region of one of said borders 9, 10. Being flush with means that the face of the supplementary wall 16 which is opposite the cavity 13 extends in the extension of the border 9, 10 such that it is flush to form a substantially smooth surface.

This embodiment provides a superconducting bulk 7 with a cavity 13 and the supplementary wall 16 which forms a screen, the effect being an increase in the screening of the magnetic flow for θ belonging to [0.4 rad; 0.9 rad] in comparison with a superconducting bulk 7 according to the first embodiment. Simultaneously, the mass of the superconducting bulk according to this second embodiment remains less than that of conventional superconducting bulks 7. This second embodiment therefore forms a better screening/mass compromise than the first embodiment.

Optionally, in a variant embodiment, the superconducting bulk 7 can comprise a first supplementary wall 16 being flush with the first border 9 and a second supplementary wall 16 being flush with the second border 10. In this variant embodiment, the screening is substantially comparable to that obtained with a conventional superconducting bulk 7, and reduces its mass. In fact, the variation of the axial component of the magnetic field armature $B_z(T)$ of the superconducting bulks 7 according to this variant embodiment is substantially equal to that of conventional superconducting bulks 7. Also, since the mass of the superconducting bulks 7 is reduced, it is possible to boost the speed of rotation of the rotor and therefore improve the power of the electric engine in comparison with conventional electric engines.

This variant embodiment therefore forms an even better screening/mass compromise.

Figure 5A:
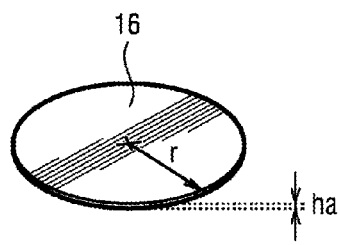
FIGS. 5a) and 5b) illustrate two elements forming the superconducting bulk according to a second embodiment of the invention and shown in FIG. 5c).
Figure 5B:
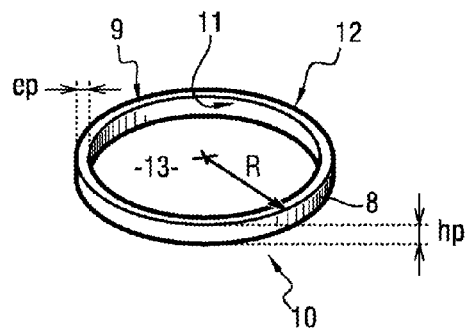

As illustrated in FIGS. 5*a*) and 5*b*), the supplementary wall 14, 15, 16 has a height $h_a$ and a radius r, while the external face 12 of the superconducting bulk 7 has a height $h_p$ and a radius R. The thickness of the superconducting bulk which corresponds to R-r is known as $e_p$.

From these parameters, the ratios $$\alpha_p = \frac{h_p}{R} \text{ and } \alpha_a = \frac{h_a}{R}$$

are defined. Preferably:
$\alpha_p \leq 0.25$
$h_p \leq e_p$ and
$\alpha_a \leq 0.025$ For example, a bulk of radius R=40 mm will preferably have a height $h_p$ less than or equal to 10 mm, a thickness $e_p$ greater than or equal to 10 mm and a supplementary wall 16 of height $h_a$ less than or equal to 1 mm.

In a third embodiment (see FIG. 6), the superconducting bulk 7 also comprises at least one supplementary wall 14, 15, or external wall 14, 15, attached and fixed onto one at least of the first border 9 and the second border 10.

This embodiment produces a superconducting bulk 7 with a cavity 13 and at least one external wall 14, 15 which forms a screen, with the effect of increasing screening of the magnetic flow for θ belonging to [0.4 rad; 0.9 rad] in comparison with a superconducting bulk 7 according to first embodiment. Simultaneously, the mass of the superconducting bulk according to this second embodiment remains less than that of conventional superconducting bulks 7.

Optionally, and as illustrated in FIG. 6, a first external wall 14 is attached to and fixed onto the first border 9 and a second external wall 15 is attached to and fixed onto the second border 10 so as to close off the cavity 13. As for the variant embodiment of the second embodiment described above, the screening resulting from this superconducting bulk 7 is substantially comparable to that obtained with a conventional superconducting bulk 7, at the same time reducing its mass so that it is possible to increase the speed of rotation of the rotor and improve the power of the electric engine.

In a fourth embodiment (see especially FIGS. 8 and 9), the superconducting bulk 7 at the same time comprises a first external wall 14 attached to and fixed onto (or being flush with) the first border 9, a second external wall 15 attached to and fixed onto (or being flush with) the second border 10 and at least one third supplementary wall 16, or internal wall 16, extending within the cavity 13 from the internal face 11 at a distance from the first and the second border 9, 10 so as to divide the cavity 13 into one or more parts.

Figure 8:
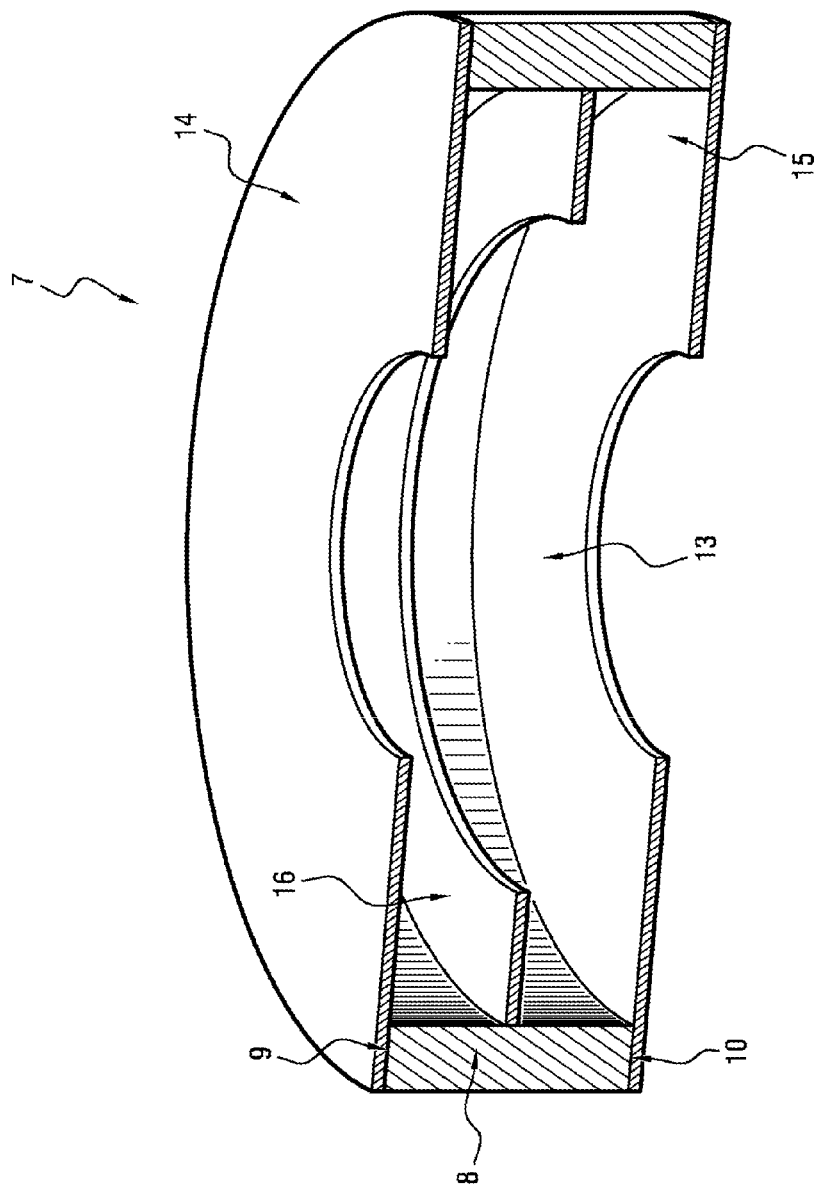
FIGS. 8 and 9 are sectional view of a fourth embodiment of a superconducting bulk according to the invention.

In FIG. 8, the superconducting bulk 7 comprises a single internal wall 16, overall centred between the first and the second external wall 14, 15. The cavity 13 is therefore divided into two parts, which are of equal volume here. As a variant, the external wall 16 could be positioned so as to divide the cavity 13 into two parts of different volume.

Figure 9:
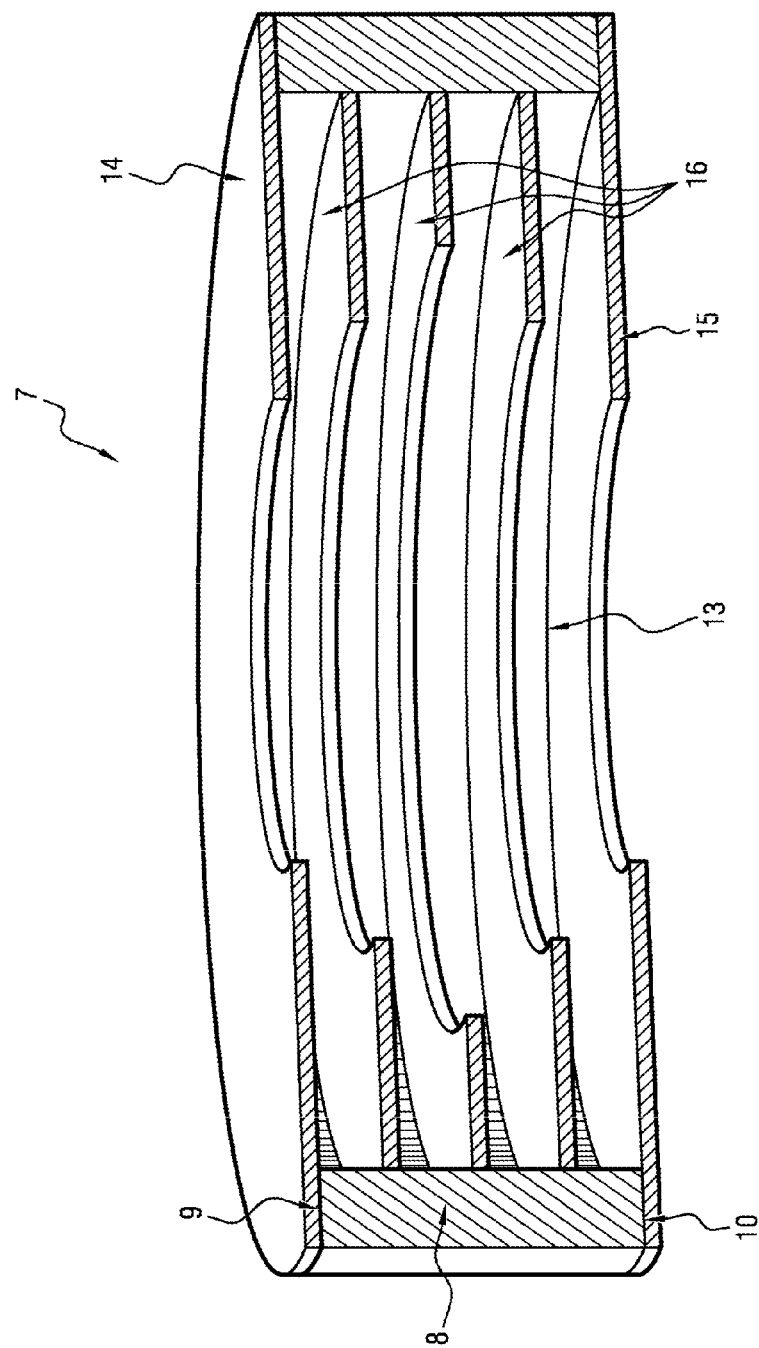

Optionally, the superconducting bulk 7 can comprise more internal walls 16 (*n*) which divide the cavity 13 into n−1 parts, which can be the same volume or different volumes. Therefore, by way of example FIG. 9 illustrates a superconducting bulk 7 comprising three internal walls 16 which are equally distributed between the first and the second external wall 14, 15. The cavity 13 is therefore here divided into four parts which are of equal volume. In particular, the internal walls 16 are symmetrical relative to the normal vector plane z (axis of rotation of the superconducting bulk 7).

If appropriate, the external 14, 15 and internals walls 16 can have the same thickness.

If appropriate, in the second, the third and the fourth embodiment, all or some of the external 14, 15 and internal 16 walls can comprise a through hole, preferably coaxial with the circumferential wall 8, so as to further reduce the mass of the superconducting bulk 7. This through hole however reduces screening of the superconducting bulk 7.

Preferably, when the superconducting bulk 7 comprises at least two internal walls 16 (as per the fourth embodiment), the first and/or the second external wall 14, 15 comprises a through hole and all or some of the internal walls 16 can be devoid of a through hole, effectively retaining efficacious screening of the superconducting bulk 7.

As a variant, the first external wall 14, the second external wall 15 and at least one of the internal walls 16, for example each internal wall 16, can comprise a through hole for reducing the mass of the superconducting bulk 7: in this case, the internal diameter of the through hole of the first and second external walls 14, 15 is preferably less than or equal to that of the internal wall or internal walls 16 so as to limit reduction of screening. In an embodiment, when all the supplementary walls comprise a through hole, the internal diameter of the through hole of the first and of the second external wall 14, 15 is less than or equal to the internal diameter of the through hole of the internal walls. Where appropriate, the internal diameter of the internal walls 16 can be different. Typically, the further an internal wall 16 is from the external wall 14 or 15, the larger its diameter. By way of example, when the superconducting bulk 7 comprises three internal walls 16, the internal diameter of the internal wall 16 located in the centre of the cavity 13 is greater than the internal diameter of the through orifices of the internal walls 16 which enclose it. This configuration improves screening and reduces the mass of the superconducting bulk 7.

According to yet another variant, the internal diameter of all the through orifices can be equal so as to reduce their mass and simplify their production.

It may be noted that the ratios defined above for the third embodiment apply mutatis mutandis to the fourth embodiment. Therefore, for each supplementary wall there is $\alpha_p \leq 0.25$, $h_p \leq e_p$ and $\alpha_a \leq 0.025$.

The superconducting bulks 7 are obtained via a manufacturing process S comprising the making of the circumferential wall 8 by placing the cavity 13 between the first border 9, the second border 10 and the internal face 11.

For this, during a step S1 the circumferential wall 8 is made.

For this purpose, the circumferential wall 8 can be produced conventionally by stacking tapes. In this case, the tapes can be pre-cut so as to form a hole at the centre, then stacked until they reach the preferred thickness for the circumferential wall 8. Thickness here means the distance between the internal face 11 and the external face 12 of the circumferential wall 8 along an axis radial to the axis of symmetry of the superconducting bulk 7.

As a variant, the circumferential wall 8 is obtained by germ growth. In this variant embodiment, the resulting circumferential wall 8 has the form of a solid disc. It is therefore necessary to machine it to form the cavity 13, for example by boring.

The result of this step S1 is therefore a superconducting bulk 7 according to the first embodiment, comprising a circumferential wall 8 wherein is formed a cavity 13 which passes through and terminates from the first border 9 of the circumferential wall 8 to the second border 10.

To make a superconducting bulk 7 according to the second or third embodiment, the process also comprises a step S2 for making at least one supplementary wall 14, 15, 16.

The supplementary wall 14, 15, 16 can be obtained according to any one of conventional production processes for superconducting bulks 7, for example by germ growth or stack of tapes. This supplementary wall 14, 15, 16 can in fact be considered as a conventional superconducting bulk 7.

As a variant, the supplementary wall 14, 15, 16 can comprise a through hole. In this variant embodiment, the supplementary wall 14, 15, 16 results from the same production steps as described in step S1 as the circumferential wall 8. As pointed out above, the through hole can be formed in all or some of the walls 14, 15, 16 and have an identical internal diameter in each wall 14, 15, 16, or different.

Then during a step S3, the supplementary wall or the supplementary walls 14, 15, 16 obtained at step S2 are assembled, for example by adhesion, with the circumferential wall 8.

For this purpose, a supplementary wall 14, 15 16 can:
either be fixed against the internal face 11 of the circumferential wall 8, at a distance from the first border 9 and the second border 10 (steps S31),
or be attached and fixed onto the first border 9 (step S32).
or be fixed against the internal face 11 so as to be flush with the first border 9 (step S33).

If appropriate, steps S32 and S33 can be reiterated so as to attach and fix a second supplementary wall 15, 16 onto the second border 10 or so as to be flush with the second border 10, so as to close the cavity 13.

Optionally, at the same time the process S comprises steps S31, S32 and S33, step S33 which can be reiterated to assemble several internal walls 16 against the internal face 11 of the circumferential wall 8.

The invention claimed is:

1. A superconducting electric machine comprising an inductor comprising a plurality of superconducting bulks and an armature comprising an arrangement of non-superconducting electromagnetic coils, wherein each superconducting bulk comprises:
   a circumferential wall comprising:
   a first border,
   a second border opposite the first border, and
   an internal face connecting the first border and the second border;
   a cavity formed between the first border and the second border, the cavity being delimited by the internal face; and
   a supplementary wall each either covers the first border, or is flush with said first border so as to cover at least partially the cavity, or extends from the internal face at a distance from the first border and the second border so as to divide the cavity into two parts the circumferential wall and the supplementary wall being made of a superconducting material.

2. An aircraft comprising a superconducting electrical machine comprising an inductor comprising at least one superconducting bulk according to claim 1 and an armature, the superconducting electrical machine being fixed to the aircraft.

3. The superconducting electric machine according to claim 1, wherein the supplementary wall comprises a through hole.

4. The superconducting electric machine according to claim 1, wherein the supplementary wall covers the first border or is flush with the first border so as to cover at least partially the cavity, and the superconducting bulk also comprises a second supplementary wall covering the second border or flush with the second border so as to close at least partially the cavity.

5. The superconducting electric machine according to claim 4, wherein the supplementary wall covers the first border and the second supplementary wall covers the second border.

6. The superconducting electric machine according to claim 4, wherein at least one of the supplementary wall and the second supplementary wall comprises a through hole.

7. The superconducting electric machine according to claim 1, further comprising at least one third supplementary wall which extends from the internal face at a distance from the first border and the second border so as to divide the cavity into two parts.

8. The superconducting electric machine according to claim 6, wherein the supplementary wall, the second supplementary wall and the at least one third supplementary wall have a same thickness.

9. The superconducting electric machine according to claim 7, wherein at least one of the supplementary wall and the at least one third supplementary wall comprises a through hole.

10. The superconducting electric machine according to claim 7, wherein at least one of the supplementary wall and the at least one third supplementary wall is devoid of a through hole.

11. The superconducting electric machine according to claim 7, wherein each of the supplementary wall and the at least one third supplementary wall comprises a through hole.

12. The superconducting electric machine according to claim 9 wherein the supplementary wall and the third supplementary wall each comprise a through hole, an internal diameter of the through hole of the at least one third supplementary wall being greater than or equal to an internal diameter of the through hole of the supplementary wall.

13. The superconducting electric machine according to claim 12, comprising at least three third supplementary walls, the internal diameter of the through hole of the third supplementary walls which are adjacent to the supplementary wall being less than the internal diameter of the through hole of the supplementary wall which is at a distance from the first supplementary wall.

14. The superconducting electric machine according to claim 1, wherein the cavity is a through cavity from the first border to the second border.

15. The superconducting electric machine according to claim 1, wherein the cavity comprises an empty space between the circumferential wall and the supplementary wall.

16. The superconducting electric machine according to claim 1, wherein the supplementary wall has a first height, the circumferential wall has second height, an outer radius and a thickness, and wherein:
- a ratio of the first height to the outer radius is less than 0.025;
- a ratio of the second height to the outer radius is less than 0.25; and
- the second height is less that the thickness.

* * * * *